3,393,972
METHOD FOR PREPARING AMMONIUM CHROMATE
Danford H. Olson and James P. Harris, Littleton, Colo., assignors to Marathon Oil Company
No Drawing. Filed June 9, 1964, Ser. No. 373,879
6 Claims. (Cl. 23—56)

ABSTRACT OF THE DISCLOSURE

In a method for converting chromic oxide to ammonium chromate by heating chromic oxide in aqueous ammonia in the presence of oxygen, the improvement of promoting the action by the addition of compounds which increase the ionic strength of the reaction medium.

---

The present invention relates to a method for converting trivalent chromium Cr(III), to hexavalent chromium, Cr(VI). More specifically, the present invention is concerned with the conversion of chromic oxide, $Cr_2O_3$, to ammonium chromate, $(NH_4)_2CrO_4$.

It has been found that ammonium chromate and ammonium dichromate are highly useful for the oxidation of alkyl aromatic compounds to acid and amide derivatives. The hydrocarbon oxidation reactions are more fully described in a copending application of the same assignee, Ser. No. 408,884, filed Nov. 4, 1964, by Dennis E. Drayer et al.

In the course of the reactions described in the previously identified application, the ammonium chromate or dichromate oxidizing agent is converted to chromic oxide. In order to make this process economically feasible, an efficient method must be provided to convert the by-product chromic oxide back into ammonium chromate or dichromate. In copending application, Ser. No. 402,958, filed Oct. 9, 1964, by Alvin L. Benham and Harold D. McBride, assigned to the assignee of this application, a method is set forth which comprises forming a mixture of chromic oxide and aqueous ammonia and adding thereto an oxygen-containing gas to produce ammonium chromate. The reaction is preferably conducted in the presence of a suitable catalyst, such as cupric sulfate or cobalt naphthenate. Reference may be had to the specification of the noted application for a more complete disclosure of the overall chromic oxide conversion process. The present invention provides an important improvement in that method for regenerating ammonium chromate from chromic oxide.

According to the present invention, it has been found that the reaction of chromic oxide, aqueous ammonia and oxygen is significantly promoted by the addition of compounds which increase the ionic strength of the reaction medium. These compounds will be referred to as ionic promoters. Suitable ionic promoters are the alkali metal or alkaline earth metal salts and bases which are highly ionized in aqueous solution and are non-oxidizing. The term "alkali metal salts" is hereinafter intended to include ammonium salts, as well as those of the alkali metals. Examples of suitable ionic promoters are alkali metal sulfates, such as lithium sulfate, sodium sulfate, potassium sulfate and the like; alkali metal carbonates, such as lithium carbonate, sodium carbonate, potassium carbonate and the like; alkaline earth metal sulfates, such as magnesium sulfate, calcium sulfate, barium sulfate and the like; alkaline earth metal carbonates, such as magnesium carbonate, calcium carbonate, barium carbonate and the like alkali metal hydroxides, such as lithium hydroxide, sodium hydroxide, potassium hydroxide, and the like; alkaline earth metal hydroxides, such as magnesium hydroxide, calcium hydroxide, barium hydroxide and the like. Ammonium sulfate has also proven to be an effective ionic promoter.

The production of ammonium chromate can be effected by reacting chromic oxide, with oxygen in aqueous ammonia, in the presence of a suitable ionic promoter. It is not necessary to have an additional catalytic agent present. However, particularly high yields are obtained when the reaction is conducted in the presence of both an ionic promoter and a suitable catalyst. Any of the catalysts disclosed in the above-mentioned copending application may be employed, with cupric sulfate being preferred.

The present invention may be practiced by mixing chromic oxide, the ionic promoter and aqueous ammonia in a suitable vessel, preferably an autoclave. An oxygen-containing gas is then introduced into the vessel and the reactants are heated to form ammonium chromate. The product may then be recovered from the vessel.

The reaction conditions may be varied over wide limits, but good results are obtained within the following ranges of conditions:

Temperature—140° C. to 225° C. and above.
Oxygen partial pressure—20 p.s.i.a. to 500 p.s.i.a.
Ammonium hydroxide concentration—4 to 80% by weight ammonia.
$NH_3:Cr_2O_3$ mole ratio—2 to 16.
Reaction time—15 minutes or longer.

The oxygen which is used in the method of this invention can be supplied by any oxygen-containing gas. Thus, pure oxygen, air, oxygen-enriched air and various oxygen-nitrogen mixtures are all suitable. The temperature at which the oxygen is introduced into the reaction mixture is not critical. It can be added to the mixture of chromic oxide, the ionic promoter and aqueous ammonia at room temperature or above. It is preferred, however, to introduce the oxygen into the reaction vessel after the other reactants have been heated to approximately 125° C.

Where the reaction is catalyzed, good results are obtained by the addition of from 0.01 to 0.06 mole of cupric sulfate catalyst per mole of chromic oxide. Preferably, the amount of catalyst is from about 0.02 to 0.04 mole per mole of chromic oxide.

The ionic promoter is effective in small amounts. Generally, about 1.25 to 2.50 grams of the ionic promoter per mole of the catalyst is sufficient to enhance the yield.

The following are illustrative examples of the practice of the invention:

Example 1.—To a 300 ml. rocking autoclave there were added 2.12 grams $Cr_2O_3$, 1.60 ml. of an aqueous (10% by weight or by volume) NaOH solution, and 100 ml. of ammonium hydroxide solution (7.5% by weight $NH_3$). The mixture was heated to a temperature of 127° C. and oxygen was added to provide an oxygen partial pressure of 200 p.s.i.a. The initial pH of the reaction was 13.10. The mixture was then heated to 180° C. and reacted at this temperature for 60 minutes. The mixture was then cooled to about room temperature. The final pH was 11.20. A yield of 22.65% Cr(VI) was obtained.

Example 2.—The procedure of Example 1 was repeated, but the concentration of $NH_3$ in the ammonium hydroxide solution was raised from 7.5% to 15%. Also, the amount of aqueous (10%) NaOH solution was reduced from 1.60 ml. to 0.68 ml. Initial and final pH's of 13.35 and 11.51 respectively were measured. The yield was 22.24%.

Example 3.—The procedure of Example 2 was repeated, but 18.92 grams of $Na_2SO_4$ were used in place of the NaOH solution. The final pH of the system was 11.81. A yield of 23.06% was obtained.

Examples 1–3 demonstrate that ionic promoters increase substantially the yield of ammonium chromate obtained by the present method, since yields of approximately 13% are obtained in the absence of a promoter. The data from these examples also shows that the effect is independent of change in pH of the system, since improvement is obtained with strongly ionic, but neutral salts, such as $Na_2SO_4$ (Example 3) as well as with ionic bases, such as NaOH, which raise the initial pH of the reaction mixture.

The effect on the conversion of $Cr_2O_3$ in the presence of a cupric sulfate catalyst and an ionic promoter was demonstrated in a further series of experiments. The results of these experiments, conducted according to the general procedure followed in Example 1, appear in Table 1.

TABLE 1[1]

| Run No. | $CuSO_4$ (grams) | $Na_2SO_4$ (grams) | Cr (VI) Percent Yield |
| --- | --- | --- | --- |
| 1-1 | 0 | 0 | 13.8 |
| 1-2 | 0 | 18.92 | 23.1 |
| 1-3 | 0.40 | 0 | 51.0 |
| 1-4 | 0.40 | 0.0055 | 71.8 |
| 1-5 | 0.40 | 0.0102 | 72.4 |
| 1-6 | 0.40 | 0.028 | 75.0 |
| 1-7 | 0.40 | 0.05 | 71.0 |
| 1-8 | 0.40 | 0.10 | 71.8 |
| 1-9 | 0.40 | 0.10 | 74.3 |
| 1-10 | 0.40 | 1.0 | 72.2 |
| 1-11 | 0.20 | 0.10 | 54.9 |
| 1-12 | 0.20 | 0.40 | 54.0 |
| 1-13 | 0.30 | 0.10 | 65.0 |
| 1-14 | 0.30 | 0.20 | 66.7 |
| 1-15 | 0.50 | 0.025 | 82.8 |
| 1-16 | 0.60 | 0.025 | 84.5 |
| 1-17 | 0.60 | 0.10 | 82.8 |
| 1-18 | 0.80 | 0.10 | 86.2 |
| 1-19 | 1.00 | 0.10 | 89.6 |
| 1-20 | 0.40 | 18.92 | [2] 76.0 |

[1] The tabulated results are based on the reaction of 2.12 g. $Cr_2O_3$, 25 ml. concentrated (30% $NH_3$) ammonium hydroxide, 75 ml. $H_2O$, 200 p.s.i.a. $O_2$ partial pressure added at 127° C., a reaction temperature of 180° C. and a reaction time of 60 minutes.
[2] 50 ml. $H_2O$ and 50 ml. $NH_4OH$ charged.

It is apparent from the data of Table 1 that the yield varies quite directly with variations in the amount of cupric sulfate catalyst. Thus, in the presence of 0.10 $Na_2SO_4$, the yield decreases steadily from 89.6% at 1.00 g. of $CuSO_4$ to 54.9% at 0.20 g. $CuSO_4$.

In the case of the ionic promoter, $Na_2SO_4$, however, only a small amount need be present with the cupric sulfate to enhance the yield. Given this small amount, e.g., 0.0055 g., a great improvement in yield, from about 51% to 72% is obtained with 0.40 g. $CuSO_4$ catalyst. If the amount of cupric sulfate is kept constant, however, further increases in the amount of $Na_2SO_4$ do not greatly influence the yield.

A study was also made of the use of other ionic promoters in the presence of a cupric sulfate catalyst. The results of these experiments, which were conducted according to the general procedure described above, appear in Table 2.

TABLE 2[1]

| Run No. | Salt Used (grams) | Cr (VI) Percent Yield |
| --- | --- | --- |
| 2-1 | 0.10 g. $Na_2SO_4$ | 60.8 |
| 2-2 | 0.18 g. NaOH | 65.0 |
| 2-3 | 0.10 g. $Na_2CO_3$ | 61.7 |
| 2-4 | 0.10 g. $K_2SO_4$ | 62.45 |
| 2-5 | 0.10 g. $K_2CO_3$ | 61.7 |
| 2-6 | 0.10 g. $Li_2CO_3$ | 59.9 |
| 2-7 | 0.10 g. $CaSO_4$ | 54.45 |
| 2-8 | 0.10 g. $MgSO_4$ | 54.9 |
| 2-9 | 0.10 g. $BaSO_4$ | 56.2 |
| 2-10 | 0.10 g. $Ca(OH)_2$ | 52.75 |
| 2-11 | No salt added | 52.35 |
| 2-12 | 0.10 $(NH_4)_2SO_4$ | [2] 63.4 |

[1] The tabulated results are based upon the reaction of 2.12 g. $Cr_2O_3$; 25 ml. concentrated (30% $NH_3$) ammonium hydroxide, 75 ml. $H_2O$, 0.40 g. $CuSO_4$, 200 p.s.i.a. $O_2$ partial pressure added at 127° C., a reaction temperature of 180° C. and a reaction time of 30 minutes.
[2] 60 min.

The effect of the time of reaction on the conversion of $Cr_2O_3$ in the presence of a cupric sulfate catalyst and $Na_2SO_4$ ionic promoter was also studied in a series of experiments. The results of these experiments appear in Table 3.

TABLE 3[1]

| Run No. | Time at 180° C. (minutes) | Cr (VI) Percent Yield |
| --- | --- | --- |
| 3-1 | 0 | 21.1 |
| 3-2 | 9 | 39.7 |
| 3-3 | 20 | 50.2 |
| 3-4 | 30 | 60.8 |
| 3-5 | 60 | 71.8 |
| 3-6 | 90 | 80.6 |

[1] The tabulated results are based on the reaction of 2.12 g. $Cr_2O_3$, 25 ml. concentrated (30% $NH_3$) ammonium hydroxide, 75 ml. $H_2O$ and 200 p.s.i.a. $O_2$ partial pressure added at 120° C. in the presence of 0.40 g. $CuSO_4$ and 0.10 g. $Na_2SO_4$ at a reaction temperature of 180° C.

It is apparent from the data of Table 3 that the yield increases progressively with the increase in the length of time that the reaction medium is held at 180° C.

In the absence of $Na_2SO_4$, a yield of 52.35% was obtained after 30 minutes reaction time at 180° C., as seen in Table 2, Run No. 2–11. Substantially the same yield, about 51.0%, was obtained after 60 minutes at 180° C., as seen in Table 1, Run No. 1–3. However, as shown in Table 3, the presence of an ionic promoter, such as $Na_2SO_4$, was effective in increasing the yield progressively through the first, second and third half hours of reaction time at 180° C. to 60.8%, 71.8% and 80.6%, respectively.

Another series of experiments was conducted to determine the effect of the temperature of reaction on the yield of ammonium chromate obtained by the present method. The results of these experiments appear in Table 4.

TABLE 4[1]

| Run No. | Reaction Time (minutes) | Reaction Temperature (° C.) | Cr (VI) Percent Yield |
| --- | --- | --- | --- |
| 4-1 | 60 | 140 | 27.6 |
| 4-2 | 60 | 160 | 47.7 |
| 4-3 | 60 | 180 | 71.8 |
| 4-4 | 60 | 190 | 81.0 |
| 4-5 | 60 | 200 | 89.5 |
| 4-6 | 30 | 140 | 21.1 |
| 4-7 | 30 | 160 | 29.7 |
| 4-8 | 30 | 180 | 60.8 |
| 4-9 | 30 | 200 | 81.0 |

[1] The tabulated results are based on the reaction of 2.12 g. $Cr_2O_3$ with 25 ml. concentrated (30% $NH_3$) ammonium hydroxide, 75 ml. $H_2O$ and 200 p.s.i.a. $O_2$ partial pressure added at 127° C. in the presence of 0.40 g. $CuSO_4$ and 0.10 g. $Na_2SO_4$.

It is clear from the data of Table 4 that yield increases with the increase in reaction temperature up to 200° C. Optimum results in the presence of 0.40 $CuSO_4$ and 0.10 $Na_2SO_4$ are obtained by reaction at about 200° C. for 60 minutes as seen in Run No. 4–5.

The process of this invention has been described in full detail and has been illustrated by a large number of specific examples. It will, therefore, be obvious to those skilled in the art that various changes and modifications in the method may be made without departing from the spirit or scope of the invention as expressed in the following claims.

What is claimed is:

1. In a method for producing ammonium chromate comprising reacting at an elevated temperature for at least about 15 minutes chromic oxide, aqueous ammonia and oxygen in the presence of a catalyst selected from the group consisting of cupric sulfate and cobalt naphthenate, wherein,
said aqueous ammonia has an ammonia content of from 4% to 80% by weight, and the mole ratio of said ammonia to said chromic oxide in the mixture is in the range of from 2 to 16,
the oxygen partial pressure is from 20 to 500 p.s.i.a., said temperature is in the range of from about 140° to about 225° C. to produce ammonium chromate, the improvement comprising carrying out said reaction in the presence of a non-oxidizing ionic promoter, in an amount sufficient to enhance the yield of ammonium chromate, selected from the group consisting of alkali metal, ammonium and alkaline earth metal sulfates, alkali metal and alkaline earth metal carbonates and alkali metal and alkaline earth metal hydroxides.

2. The method of claim 1 wherein the catalyst is cupric sulfate and is present in an amount of at least .01 mole per mole of the chromic oxide.

3. The method of claim 1 wherein the ammonia content of said aqueous ammonia is from 4.5% to 15% by weight.

4. The method of claim 1 wherein said promoter is an alkali metal sulfate.

5. The method of claim 2 wherein said promoter is an alkali metal sulfate and is present in an amount of at least about 1.25 grams per mole of cupric sulfate.

6. The method of producing ammonium chromate comprising:
   mixing chromic oxide and aqueous ammonia having an ammonia content of from 4% to 80% by weight, the mole ratio of said ammonia to said chromic oxide in the mixture being in the range of from 2 to 16,
   placing the mixture in an autoclave with cupric sulfate in an amount from 0.01 to 0.06 mole per mole of chromic oxide and at least about 1.25 grams of sodium sulfate per mole of cupric sulfate,
   subjecting the contents of the autoclave to an oxygen partial pressure of about 200 p.s.i.a., and
   heating at about 180° C. for about 60 minutes to produce an ammonium chromate solution.

References Cited

UNITED STATES PATENTS

| | | | |
|---|---|---|---|
| 1,955,326 | 4/1934 | Demant | 23—56 |
| 2,012,061 | 8/1935 | Demant | 23—56 |
| 2,012,062 | 8/1935 | Demant | 23—56 |
| 2,494,215 | 1/1950 | Udy | 23—56 |
| 2,501,952 | 3/1950 | Maier | 23—56 |

FOREIGN PATENTS 363,423  12/1931  Great Britain.

OSCAR R. VERTIZ, *Primary Examiner.*

B. H. LEVENSON, *Assistant Examiner.*